(12) United States Patent
Wu et al.

(10) Patent No.: US 10,728,099 B2
(45) Date of Patent: Jul. 28, 2020

(54) METHOD FOR PROCESSING VIRTUAL MACHINE CLUSTER AND COMPUTER SYSTEM

(71) Applicant: Huawei Technologies Co., Ltd., Shenzhen (CN)

(72) Inventors: Xiangping Wu, Shenzhen (CN); Long Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 219 days.

(21) Appl. No.: 15/812,747

(22) Filed: Nov. 14, 2017

(65) Prior Publication Data

US 2018/0097701 A1 Apr. 5, 2018

Related U.S. Application Data

(63) Continuation of application No. PCT/CN2015/095654, filed on Nov. 26, 2015.

(30) Foreign Application Priority Data

May 14, 2015 (CN) .......................... 2015 1 0244239

(51) Int. Cl.
*H04L 12/24* (2006.01)
*H04L 12/40* (2006.01)
*H04L 12/26* (2006.01)

(52) U.S. Cl.
CPC ............. *H04L 41/12* (2013.01); *H04L 12/40* (2013.01); *H04L 41/00* (2013.01); *H04L 43/10* (2013.01)

(58) Field of Classification Search
None
See application file for complete search history.

(56) References Cited

U.S. PATENT DOCUMENTS 6,456,599 B1 * 9/2002 Elliott .................. H04W 40/26
370/254
7,184,421 B1 * 2/2007 Liu ...................... H04L 12/189
370/254
(Continued)

FOREIGN PATENT DOCUMENTS

CN 101567804 A 10/2009
CN 102110071 A 6/2011
(Continued)

OTHER PUBLICATIONS

"VMware-vCenter-Server-Heartbeat—Product Manual," From https://wenku.baidu.com/view/75da52ef0975f46527d3e156.html. (Aug. 4, 2011).

(Continued)

*Primary Examiner* — Esther B. Henderson
(74) *Attorney, Agent, or Firm* — Leydig, Voit & Mayer, Ltd.

(57) ABSTRACT

The present disclosure provides a method for managing a virtual machine cluster. The method includes: sending, by the first virtual machine, a first heartbeat message to at least two neighboring virtual machines in the N virtual machines, so that the at least two neighboring virtual machines detect the first heartbeat message, where a result of detecting the first heartbeat message is used to determine a status of the first virtual machine, and the first virtual machine establishes a neighbor relationship with the at least two neighboring virtual machines according to the information about the N virtual machines; and detecting, by the first virtual machine as a neighboring virtual machine of a second virtual machine in the at least two virtual machines, a second heartbeat message sent by the second virtual machine.

18 Claims, 5 Drawing Sheets

(56) References Cited

U.S. PATENT DOCUMENTS

| | | | |
|---|---|---|---|
| 2003/0007461 A1* | 1/2003 | Chen | H04L 29/12254 370/254 |
| 2005/0058084 A1* | 3/2005 | Hester | H04W 48/16 370/254 |
| 2006/0268791 A1* | 11/2006 | Cheng | H04W 72/1278 370/338 |
| 2012/0030670 A1 | 2/2012 | Vijay et al. | |
| 2013/0174152 A1 | 7/2013 | Yu | |
| 2013/0204995 A1 | 8/2013 | Fu et al. | |
| 2015/0120887 A1 | 4/2015 | Hu et al. | |
| 2016/0232024 A1* | 8/2016 | Hamilton, II | G06F 9/45558 |

FOREIGN PATENT DOCUMENTS

| | | |
|---|---|---|
| CN | 102355369 A | 2/2012 |
| CN | 102455951 A | 5/2012 |
| CN | 102591443 A | 7/2012 |
| CN | 102934412 A | 2/2013 |
| CN | 103201724 A | 7/2013 |
| CN | 103259685 A | 8/2013 |
| CN | 103593243 A | 2/2014 |
| CN | 104601622 A | 5/2015 |
| WO | 2011156932 A1 | 12/2011 |
| WO | 2012016175 A1 | 2/2012 |

OTHER PUBLICATIONS

Mei, "Cassandra Architecture," From http://www.cnblogs.com/hxdong/archive/2013/06/16/3135455.html (Retrieved from the Internet on Dec. 12, 2017).

* cited by examiner

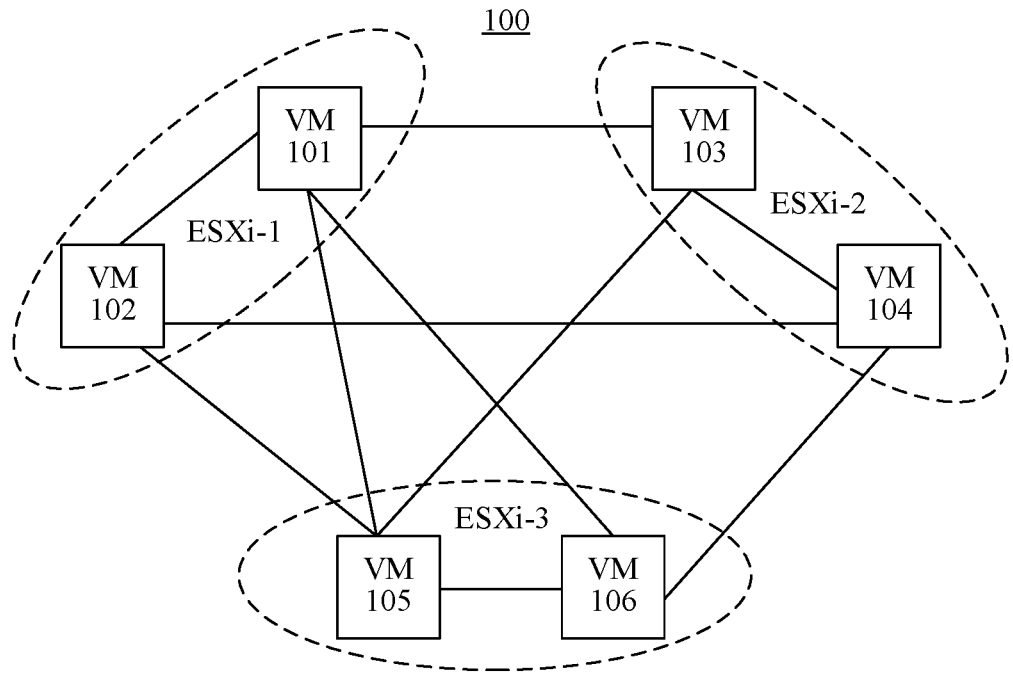

FIG. 1

| A first virtual machine sends a first heartbeat message to at least two neighboring virtual machines, so that the at least two neighboring virtual machines detect the first heartbeat message, where a result of detecting the first heartbeat message is used to determine a status of the first virtual machine, and the first virtual machine establishes a neighbor relationship with the at least two neighboring virtual machines according to information about N virtual machines | 210 |

| As a neighboring virtual machine of a second virtual machine in the at least two virtual machines, the first virtual machine detects a second heartbeat message sent by the second virtual machine | 220 |

FIG. 2

METHOD FOR PROCESSING VIRTUAL MACHINE CLUSTER AND COMPUTER SYSTEM

CROSS-REFERENCE TO RELATED APPLICATIONS

This application is a continuation of International Application No. PCT/CN2015/095654, filed on Nov. 26, 2015, which claims priority to Chinese Patent Application No. 201510244239.8, filed on May 14, 2015. The disclosures of the aforementioned applications are hereby incorporated by reference in their entireties.

TECHNICAL FIELD

Embodiments of the present disclosure relate to the field of information technologies, and more specifically, to a method for processing a virtual machine cluster and a computer system.

BACKGROUND

A cluster is generally a concurrent or distributed system that includes some nodes (for example, computers or virtual machines) that are connected to each other. The nodes work together, run a series of common application programs, and also provide a single system mapping for a user and an application program. For example, externally, a computer cluster is a system and provides a unified service for the outside; internally, computers in the cluster are physically connected by using a cable, and are logically connected by using cluster software. A server cluster is formed by connecting multiple servers by using a communication link. Externally, the servers work like one server. Internally, external loads are dynamically allocated to the servers by using a specific mechanism, thereby achieving high performance and high availability that belong only to a super server.

A virtual machine (VM) is software running on a host. The virtual machine may create an environment between a computer platform and an end user, and the end user performs an operation based on the environment created by the software. A virtual machine cluster refers to a concurrent or distributed system that includes multiple virtual machines that are connected to each other.

A master/slave (Master/Slave) architecture is generally used for the virtual machine cluster. A master host is responsible for monitoring all slave hosts, and restarts a virtual machine on the slave host when the slave host is down. A slave node also receives a heartbeat message sent by a master node, to acknowledge whether the master node survives. If a host of the master host is down, the slave host in the cluster re-selects a master host.

As a management center of the cluster, the master host is responsible for monitoring and managing all the slave hosts in the cluster. When there are an excessively large quantity of slave hosts in the cluster, performance of the master host is insufficient to support maintenance of a large quantity of slave hosts, and consequently, the master host becomes a bottleneck of the entire cluster, and overall performance of the virtual machine cluster is deteriorated. In addition, when the master host is faulty, the slave hosts re-elect a new master host. This process needs to consume some time, thereby prolonging a fault recovery time of the cluster and deteriorating a fault tolerance capability of the virtual machine cluster. In addition, some slave hosts may lose contact with the master host. The slave hosts re-elect a master host. Consequently, two independent cluster sub-regions exist in one cluster. Therefore, each master host of the two sub-regions incorrectly considers that the other is faulty, and contends for resources, thereby causing insufficiency of resources and data damage, and deteriorating performance of the virtual machine cluster. Therefore, using a master node as a management center of a virtual machine cluster affects a fault tolerance capability and performance of the virtual machine cluster.

SUMMARY

According to a method for processing a virtual machine cluster and a computer system provided in embodiments of the present disclosure, a fault tolerance capability and performance of a virtual machine cluster can be improved.

According to a first aspect, a method for processing a virtual machine cluster is provided, where the virtual machine cluster includes N virtual machines, each virtual machine in the N virtual machines stores a virtual machine list and works as a first virtual machine in a peer-to-peer manner, the virtual machine list includes information about the N virtual machines, and the method of the first aspect includes: sending, by the first virtual machine, a first heartbeat message to at least two neighboring virtual machines in the N virtual machines, so that the at least two neighboring virtual machines detect the first heartbeat message, where a result of detecting the first heartbeat message is used to determine a status of the first virtual machine, and the first virtual machine establishes a neighbor relationship with the at least two neighboring virtual machines according to the information about the N virtual machines; and detecting, by the first virtual machine as a neighboring virtual machine of a second virtual machine in the at least two virtual machines, a second heartbeat message sent by the second virtual machine, where a result of detecting the second heartbeat message and a detection result of detecting, by another neighboring virtual machine of the second virtual machine, a heartbeat message sent by the second virtual machine are used to determine a status of the second virtual machine.

With reference to the first aspect, in a possible implementation manner, the method further includes: sending, by the first virtual machine, first synchronization information to the at least two neighboring virtual machines, where the first synchronization information is used to indicate an update of the virtual machine list stored in the first virtual machine, so that the at least two neighboring virtual machines update their respective virtual machine lists stored therein; receiving, by the first virtual machine, second synchronization information sent by the second virtual machine, where the second synchronization information is used to indicate an update of a virtual machine list stored in the second virtual machine; and updating, by the first virtual machine according to the second synchronization information, the virtual machine list stored in the first virtual machine.

With reference to the first aspect or the first possible implementation manner, in a possible implementation manner, the at least two neighboring virtual machines include two to six virtual machines that are in the N virtual machines and that have a capability of exchanging information directly with the first virtual machine.

With reference to the first aspect, in a possible implementation manner, the method further includes: when the first virtual machine determines that the status of the second virtual machine is faulty, triggering, by the second virtual machine, the second virtual machine to be restarted, or triggering the second virtual machine to be migrated from a source host of the second virtual machine to a target host, where the source host is a faulty host, and the target host is a normal host.

With reference to the first aspect, in a possible implementation manner, the first feedback information further includes configuration information of the second virtual machine; the method further includes: when the first virtual machine determines that the status of the second virtual machine is faulty and the second virtual machine cannot be restarted, triggering, by the first virtual machine, the second virtual machine to be migrated from a source host on which the second virtual machine is located to a target host, where the source host is a faulty host, and the target host is a normal host.

With reference to the first aspect, in a possible implementation manner, the method further includes: when the first virtual machine determines that the status of the second virtual machine is a left state, triggering, by the first virtual machine, the second virtual machine to be deleted from the source host on which the second virtual machine is located.

With reference to any the first aspect, in a possible implementation manner, the method of the first aspect further includes: sending, by the first virtual machine, the result of detecting the second heartbeat message to an upper-layer node of the N virtual machines, so that the upper-layer node determines the status of the second virtual machine according to the result of detecting the second heartbeat message and the result of detecting the heartbeat message sent by the second virtual machine to the another neighboring virtual machine of the second virtual machine; and receiving, by the first virtual machine, an indication message sent by the upper-layer node, where the indication message is used to indicate the status of the second virtual machine.

With reference to the first aspect, in a possible implementation manner, the method of the first aspect further includes: receiving, by the first virtual machine, the detection result of detecting, by the another neighboring virtual machine of the second virtual machine, the heartbeat message sent by the second virtual machine; and determining, by the first virtual machine, the status of the second virtual machine according to the result of detecting the second heartbeat message and the detection result of detecting, by the another neighboring virtual machine of the second virtual machine, the heartbeat message sent by the second virtual machine.

With reference to the first aspect, in a possible implementation manner, when the first virtual machine is added to the virtual machine cluster, the method of the first aspect further includes: sending, by the first virtual machine, information about the first virtual machine to another virtual machine in the N virtual machines; and receiving, by the first virtual machine, respective information sent by the another virtual machine in the N virtual machines, so as to generate the virtual machine list.

With reference to the first aspect, in a possible implementation manner, when the first virtual machine is added to the virtual machine cluster, the first virtual machine sends registration information to an index server, where the registration information includes information about the first virtual machine, and the index server is a registration center of the virtual machine cluster and is configured to provide a registration service for a virtual machine in the virtual machine cluster; and the first virtual machine receives information about another virtual machine in the N virtual machines that is sent by the index server, so as to generate the virtual machine list.

With reference to any one of the first aspect or the foregoing possible implementation manners of the first aspect, in a tenth possible implementation manner, the method further includes: selecting, by the first virtual machine according to the information about the N virtual machines that is stored in the virtual machine list, at least two virtual machines from the N virtual machines as neighboring virtual machines by using a neighbor relationship algorithm.

With reference to the first aspect, in an eleventh possible implementation manner, the information about the N virtual machines includes any one or a combination of the following: status information of each virtual machine in the N virtual machines, neighbor relationship information of each virtual machine in the N virtual machines, a quantity of times of starting each virtual machine in the N virtual machines, a heartbeat value of each virtual machine in the N virtual machines, configuration information of each virtual machine in the N virtual machines, or configuration information of the virtual machine cluster.

According to a second aspect, a computer system is provided, where the computer system includes a physical hardware layer of at least one computer node, a virtual machine cluster runs at the physical hardware layer of the at least one computer node, the virtual machine cluster includes N virtual machines, each virtual machine in the N virtual machines stores a virtual machine list and works as a first virtual machine in a peer-to-peer manner, the virtual machine list includes information about the N virtual machines, and the first virtual machine includes: a sending module, configured to send a first heartbeat message to at least two neighboring virtual machines in the N virtual machines, so that the at least two neighboring virtual machines detect the first heartbeat message, where a result of detecting the first heartbeat message is used to determine a status of the first virtual machine, and the first virtual machine establishes a neighbor relationship with the at least two neighboring virtual machines according to the information about the N virtual machines; and a receiving module, configured to detect a second heartbeat message sent by a second virtual machine in the at least two virtual machines, where the first virtual machine is a neighboring virtual machine of the second virtual machine, and a result of detecting the second heartbeat message and a detection result of detecting, by another neighboring virtual machine of the second virtual machine, a heartbeat message sent by the second virtual machine are used to determine a status of the second virtual machine.

With reference to the second aspect, in a possible implementation manner, the sending module further sends first synchronization information to the at least two neighboring virtual machines, where the first synchronization information is used to indicate an update of the virtual machine list stored in the first virtual machine, so that the at least two neighboring virtual machines update their respective virtual machine lists stored therein; the receiving module further receives second synchronization information sent by the second virtual machine, where the second synchronization information is used to indicate an update of a virtual machine list stored in the second virtual machine; and the first virtual machine further includes an update module, configured to update, according to the second synchronization information, the virtual machine list stored in the first virtual machine.

With reference to the second aspect, in a possible implementation manner, the at least two neighboring virtual machines include two to six virtual machines that are in the N virtual machines and that have a capability of exchanging information directly with the first virtual machine.

With reference to any one of the second aspect or the foregoing possible implementation manners of the second aspect, in a third possible implementation manner, the computer system of the second aspect further includes a triggering module, configured to: when it is determined that the status of the second virtual machine is faulty, trigger the second virtual machine to be restarted, or trigger the second virtual machine to be migrated from a source host of the second virtual machine to a target host, where the source host is a faulty host, and the target host is a normal host.

With reference to the second aspect, in a possible implementation manner, the computer system of the second aspect further includes a triggering module, configured to: when it is determined that the status of the second virtual machine is faulty and the second virtual machine cannot be restarted, trigger the second virtual machine to be migrated from a source host on which the second virtual machine is located to a target host, where the source host is a faulty host, and the target host is a normal host.

With reference to a the second aspect, in a possible implementation manner, the computer system of the second aspect further includes the triggering module, configured to: when it is determined that the status of the second virtual machine is a left state, trigger the second virtual machine to be deleted from the source host on which the second virtual machine is located.

With reference to the second aspect, in a possible implementation manner, the sending module further sends the result of detecting the second heartbeat message to an upper-layer node of the N virtual machines, so that the upper-layer node determines the status of the second virtual machine according to the result of detecting the second heartbeat message and the result of detecting the heartbeat message sent by the second virtual machine to the another neighboring virtual machine of the second virtual machine; and the receiving module further receives an indication message sent by the upper-layer node, where the indication message is used to indicate the status of the second virtual machine.

With reference to the second aspect, in a possible implementation manner, the receiving module further receives the detection result of detecting, by the another neighboring virtual machine of the second virtual machine, the heartbeat message sent by the second virtual machine; and the receiving module further determines the status of the second virtual machine according to the result of detecting the second heartbeat message and the detection result of detecting, by the another neighboring virtual machine of the second virtual machine, the heartbeat message sent by the second virtual machine.

With reference to the second aspect, in an eighth possible implementation manner, when the first virtual machine is added to the virtual machine cluster, the sending module further sends information about the first virtual machine to another virtual machine in the N virtual machines, where an index server is a registration center of the virtual machine cluster and is configured to provide a registration service for a virtual machine in the virtual machine cluster; and the receiving module further receives respective information sent by the another virtual machine in the N virtual machines, so as to generate the virtual machine list.

With reference to any one of the second aspect or the foregoing possible implementation manners of the second aspect, in a ninth possible implementation manner, when the first virtual machine is added to the virtual machine cluster, the sending module further sends registration information to an index server, where the registration information includes information about the first virtual machine; and the receiving module further receives information about another virtual machine in the N virtual machines that is sent by the index server, so as to generate the virtual machine list.

With reference to any one of the second aspect or the foregoing possible implementation manners of the second aspect, in a tenth possible implementation manner, the computer system of the second aspect further includes a selection module, configured to select, according to the information about the N virtual machines that is stored in the virtual machine list, at least two virtual machines from the N virtual machines as neighboring virtual machines by using a neighbor relationship algorithm.

With reference to any one of the second aspect or the foregoing possible implementation manners of the second aspect, in an eleventh possible implementation manner, the information about the N virtual machines includes any one or a combination of the following: status information of each virtual machine in the N virtual machines, neighbor relationship information of each virtual machine in the N virtual machines, a quantity of times of starting each virtual machine in the N virtual machines, a heartbeat value of each virtual machine in the N virtual machines, configuration information of each virtual machine in the N virtual machines, or configuration information of the virtual machine cluster.

In the foregoing technical solutions, according to the embodiments of the present disclosure, each virtual machine in a virtual machine cluster may determine at least two neighboring virtual machines according to a virtual machine list stored in the virtual machine, and each virtual machine in the virtual machine cluster may send a heartbeat message to the at least two neighboring virtual machines of the virtual machine, so as to determine a status of the virtual machine according to detection results of the at least two neighboring virtual machines. Because a status of each virtual machine may be determined according to a result of detecting, by a neighboring virtual machine of the virtual machine, a heartbeat message sent by the virtual machine, a problem, existing in a master/slave architecture, that a master becomes a bottleneck of an entire cluster is avoided. In addition, because a master host is not re-elected, in a virtual machine cluster for which this solution is used to determine a status, a fault recovery time is not prolonged and no contention for resources occurs, and a fault tolerance capability and performance of the virtual machine cluster are improved.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and persons of ordinary skill in the art may still derive other drawings from these accompanying drawings without creative efforts.

FIG. 1 a schematic architectural diagram of a virtual machine cluster according to an embodiment of the present disclosure;

FIG. 2 is a schematic flowchart of a method for processing a virtual machine cluster according to an embodiment of the present disclosure;

DESCRIPTION OF EMBODIMENTS

Figure 3:
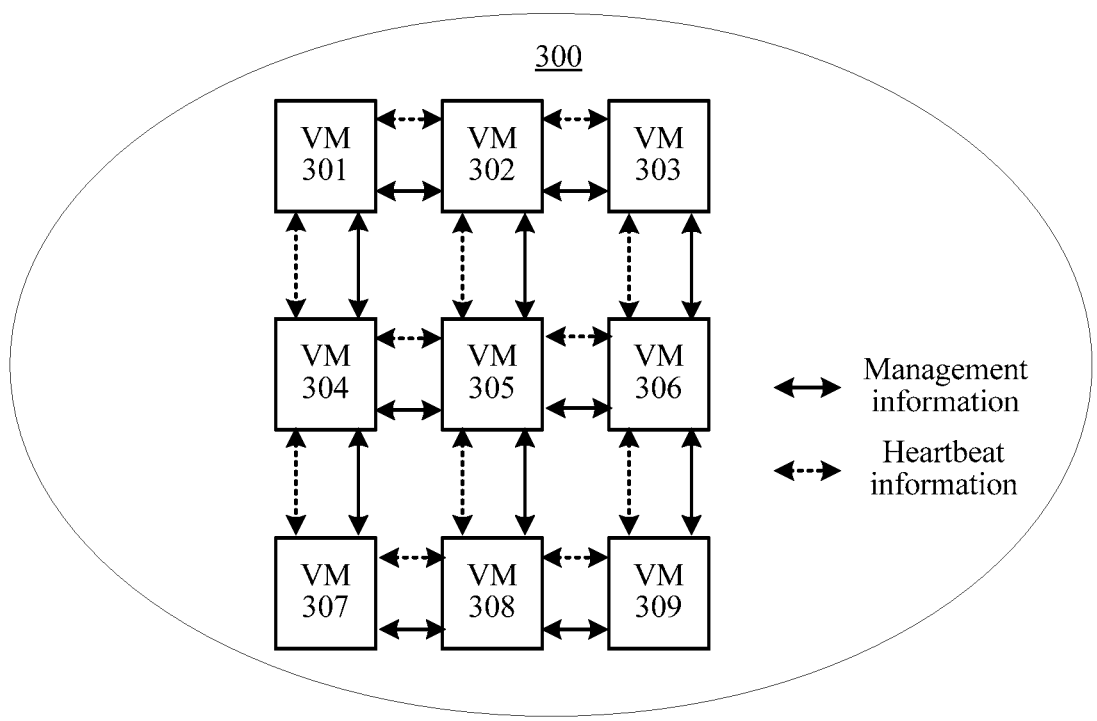
FIG. 3 is a schematic diagram of a neighbor relationship of a virtual machine cluster according to an embodiment of the present disclosure.

The following clearly and describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

FIG. 1 a schematic architectural diagram of a virtual machine cluster 100 according to an embodiment of the present disclosure.

As shown in FIG. 1, the virtual machine cluster 100 is a distributed architecture, and from a perspective of a user side, multiple virtual machines in the virtual machine cluster 100 provide a service for user equipment as a single virtual machine as a whole. Compared with a master/slave architecture of a virtual machine cluster in a conventional technology, there is a peer-to-peer relationship between the virtual machines in the virtual machine cluster 100. A computer system in which the virtual machine cluster 100 is located may include, for example, a physical host ESXi-1, a physical host ESXi-2, and a physical host ESXi-3. For example, a virtual machine VM 101 and a virtual machine VM 102 run on the host ESXi-1, a virtual machine VM 103 and a virtual machine VM 104 run on the host ESXi-2, and a virtual machine VM 105 and a virtual machine VM 106 run on the host ESXi-3. Each virtual machine in the virtual machine cluster 100 may maintain one virtual machine list that is used to store information about the virtual machines in the virtual machine cluster 100, and the information about the virtual machines in the virtual machine cluster 100 includes status information, configuration information, and/or management information. Information synchronization between virtual machines may be implemented by using a peer-to-peer (P2P) protocol. The status information is used to indicate a working status of a virtual machine, for example, CPU usage or memory usage. The configuration information is used to indicate information related to virtual machine configuration, for example, an IP address allocated to a virtual machine. The management information is used to indicate information about virtual machine management, for example, a heartbeat value of a virtual machine, a quantity of times of starting a virtual machine, or a fault, restart, or migration of a virtual machine.

The virtual machine VM 101 establishes a neighbor relationship with the virtual machines VM 102, VM 103, VM 105, and VM 106. The virtual machine 102 establishes a neighbor relationship with the virtual machines VM 101, VM 104, and VM 105. The virtual machine 103 establishes a neighbor relationship with the virtual machines VM 101, VM 105, and VM 104. The virtual machine 104 establishes a neighbor relationship with the virtual machines VM 106, VM 102, and VM 106. The virtual machine 105 establishes a neighbor relationship with the virtual machines VM 101, VM 102, and VM 103. The virtual machine 106 establishes a neighbor relationship with the virtual machines VM 101, VM 104, and VM 105. A neighbor relationship of a virtual machine may also be recorded in a virtual machine list. For example, a neighboring virtual machine of each virtual machine may also be listed in the virtual machine list. All the virtual machines may determine respective neighboring virtual machines by using a specific neighbor relationship algorithm.

It should be understood that the foregoing virtual machine cluster may be located on one physical host, or may be located on multiple physical hosts. A neighbor relationship between virtual machines is not related to a physical host on which the virtual machines are located, that is, from a perspective of a distributed cluster, only a virtual machine instead of a physical host on which the virtual machine is actually located is considered. A virtual machine may use a virtual machine that is located on a same physical host as a neighbor, or may use a virtual machine that is located on another physical host as a neighbor.

It should also be understood that the foregoing neighbor relationship may refer to a physical neighbor relationship, or may refer to a logical neighbor relationship.

It should also be understood that the foregoing physical host and a quantity of virtual machines on each physical host are described only as examples. In this embodiment of the present disclosure, the quantity of virtual machines on each physical host and a quantity of physical hosts on which a virtual machine cluster is located are not limited.

FIG. 2 is a schematic flowchart of a method for processing a virtual machine cluster according to an embodiment of the present disclosure. The method shown in FIG. 2 is executed by each virtual machine in the virtual machine cluster 100 in FIG. 1. The virtual machine cluster includes N virtual machines. Each virtual machine in the N virtual machines stores a virtual machine list and works as a first virtual machine in a peer-to-peer manner. The virtual machine list includes information about the N virtual machines. The method in FIG. 2 includes the following content.

210. The first virtual machine sends a first heartbeat message to at least two neighboring virtual machines in the N virtual machines, so that the at least two neighboring virtual machines detect the first heartbeat message, where a result of detecting the first heartbeat message is used to determine a status of the first virtual machine, and the first virtual machine establishes a neighbor relationship with the at least two neighboring virtual machines according to information about the N virtual machines.

220. As a neighboring virtual machine of a second virtual machine in the foregoing at least two virtual machines, the first virtual machine detects a second heartbeat message sent by the second virtual machine, where a result of detecting the second heartbeat message and a detection result of detecting, by another neighboring virtual machine of the second virtual machine, a heartbeat message sent by the second virtual machine are used to determine a status of the second virtual machine.

According to this embodiment of the present disclosure, the first virtual machine may be any virtual machine in the virtual machine cluster and send a heartbeat message to a neighboring virtual machine of the first virtual machine, so that the neighboring virtual machine of the first virtual machine learns, by means of monitoring, whether the first virtual machine survives. In addition, as a neighboring virtual machine of another virtual machine, the first virtual machine may also receive a heartbeat message sent by the another virtual machine, so as to learn, by means of monitoring, whether the another virtual machine survives. Specifically, each virtual machine in the virtual machine cluster may perform the foregoing 210 and 220 in a peer-to-peer manner, that is, each virtual machine may send a heartbeat message to a neighboring virtual machine of the virtual machine, so that the neighboring virtual machine of the virtual machine monitors a status of the virtual machine, for example, learns, by means of monitoring, whether the virtual machine survives. In addition, as a neighboring virtual machine of another virtual machine, the virtual machine may also receive a heartbeat message sent by the another virtual machine, so as to monitor a status of the another virtual machine. In this way, a status of each virtual machine can be comprehensively determined according to results of detecting one heartbeat message by multiple neighboring virtual machines of the virtual machine. In other words, each virtual machine in the virtual machine cluster can monitor the neighboring virtual machine of the virtual machine and can also be monitored by the neighboring virtual machine of the virtual machine. Therefore, the virtual machine cluster does not need a master node that is used to monitor heartbeat messages of all the virtual machines.

According to this embodiment of the present disclosure, each virtual machine in a virtual machine cluster may determine at least two neighboring virtual machines according to a virtual machine list stored in the virtual machine, and each virtual machine in the virtual machine cluster may send a heartbeat message to the at least two neighboring virtual machines of the virtual machine, so as to determine a status of the virtual machine according to detection results of the at least two neighboring virtual machines. Because a status of each virtual machine may be determined according to a result of detecting, by a neighboring virtual machine of the virtual machine, a heartbeat message sent by the virtual machine, a problem, existing in a master/slave architecture, that a master becomes a bottleneck of an entire cluster is avoided. In addition, because a master host is not re-elected, in a virtual machine cluster for which this solution is used to determine a status, a fault recovery time is not prolonged and no contention for resources occurs, and a fault tolerance capability and performance of the virtual machine cluster are improved.

Specifically, because in the virtual machine cluster, each virtual machine and another virtual machine have same or peer-to-peer roles, a problem existing in a virtual machine cluster in the master/slave architecture does not occur in the virtual machine cluster. Because the virtual machine cluster in this embodiment of the present disclosure does not need a master node, a problem that performance of a master node is insufficient to support maintenance of a large quantity of slave nodes does not occur, and problems (for example, a recovery time is relatively long, and a split-brain case occurs in a cluster) brought by master node re-selection caused by a faulty master node do not occur, either.

In 220, the method in FIG. 2 further includes: the first virtual machine may select, according to the information about the N virtual machines that is stored in a virtual machine list, at least two virtual machines from the N virtual machines as neighboring virtual machines by using a neighbor relationship algorithm. The foregoing at least two neighboring virtual machines may include two to six virtual machines that are in the N virtual machines and that have a capability of exchanging information directly with the first virtual machine.

For example, the foregoing neighbor relationship algorithm may include a criterion or a policy used to determine a neighbor relationship of a virtual machine. According to this embodiment of the present disclosure, a neighbor discovery algorithm in a P2P technology may be used to determine a neighbor relationship. For example, each virtual machine may select, as neighboring virtual machines of the virtual machine, two to six virtual machines that are closest to a physical location of the virtual machine and that do not belong to a same host. The neighbor relationship algorithm is not limited in this embodiment of the present disclosure. For example, each virtual machine may randomly select multiple virtual machines from a virtual machine list as neighboring virtual machines of the virtual machine.

According to this embodiment of the present disclosure, the information about the N virtual machines includes status information of each virtual machine in the N virtual machines, neighbor relationship information of each virtual machine in the N virtual machines, a quantity of times of starting each virtual machine in the N virtual machines, and a heartbeat value of each virtual machine in the N virtual machines. Configuration information includes configuration information of each virtual machine in the N virtual machines and configuration information of the virtual machine cluster. The virtual machine list may include any one or a combination of multiple pieces of management information or multiple pieces of configuration information.

For example, a quantity of times of starting a virtual machine may refer to a quantity of times of starting the virtual machine since adding of the virtual machine to the virtual machine cluster, and is used to determine whether to restart the virtual machine after the virtual machine is faulty. For example, after the quantity of times of starting exceeds a preset threshold, the virtual machine is no more restarted, and a new virtual machine is added to ensure stability of an entire system. A heartbeat value of a virtual machine refers to a total quantity of times of sending a heartbeat message by the virtual machine since last start, and is used to determine a time within which the virtual machine is normal since the last start. Configuration information of a virtual machine may include configuration information of a virtual machine cluster (ClusterConf) to which the virtual machine belongs and node information (NodeInf) of the virtual machine. A larger value of the ClusterConf indicates a newer value of the ClusterConf, and a larger value of the NodeInf indicates a newer value of the NodeInf. The virtual machine may send information stored in a virtual machine list to another virtual machine. After receiving the information, the another virtual machine maintains or updates, according to the information, information about virtual machines that is stored in the virtual machine.

It should be understood that the foregoing information may be stored in another form. For example, the foregoing information may be stored in an array form. It should also be understood that the foregoing information may further include other information that can be used to determine a neighbor relationship, for example, neighbor relationship information of another virtual machine.

Optionally, in another embodiment, the method in FIG. 2 further includes: the first virtual machine sends first synchronization information to the at least two neighboring virtual machines, where the first synchronization information is used to indicate an update of the virtual machine list stored in the first virtual machine, so that the at least two neighboring virtual machines update their respective virtual machine lists stored therein; the first virtual machine receives second synchronization information sent by the second virtual machine, where the second synchronization information is used to indicate an update of a virtual machine list stored in the second virtual machine; and the first virtual machine updates, according to the second synchronization information, the virtual machine list stored in the first virtual machine.

For example, when a status stored in each virtual machine in the virtual machine cluster is updated, the virtual machine may send, to a neighboring virtual machine of the virtual machine by using synchronization information, the information about the N virtual machines that is stored in the virtual machine; or the virtual machine may send only updated information about a virtual machine to a neighboring virtual machine by using synchronization information; or the virtual machine may send only an indication or an index of updated information about a virtual machine to a neighboring virtual machine by using synchronization information, so that the neighboring virtual machine of the virtual machine updates information about the virtual machines according to the foregoing synchronization information.

Each virtual machine may obtain, by exchanging synchronization information, management information and configuration information of the virtual machines that are stored in each neighboring virtual machine of the virtual machine, and the management information and the configuration information are newest. It may be understood that if each virtual machine in the virtual machine cluster can obtain management information and configuration information of the virtual machines that are stored in a neighboring virtual machine, and send, to the neighboring virtual machine of the virtual machine, management information and configuration information of the virtual machines that are stored in the virtual machine, each virtual machine can store management information and configuration information stored in all the virtual machines in the entire virtual machine cluster. In this way, when any virtual machine in the virtual machine cluster is faulty, a virtual machine that stores management information of the faulty virtual machine can recover the faulty virtual machine by using the stored management information. For example, the faulty virtual machine may be re-established on another physical host. It may be understood that when a virtual machine is faulty, the faulty virtual machine may be restarted first, and if the faulty virtual machine is not successfully restarted, the virtual machine may be re-established on another physical host.

Optionally, in another embodiment, the method in FIG. 2 further includes: when the first virtual machine determines that the status of the second virtual machine is faulty, the second virtual machine triggers the second virtual machine to be restarted, or triggers the second virtual machine to be migrated from a source host of the second virtual machine to a target host, where the source host is a faulty host, and the target host is a normal host.

For example, each virtual machine in the virtual machine cluster may instruct, when determining that a status of another virtual machine is faulty, a physical host on which the faulty virtual machine is located to restart or migrate the virtual machine. For example, the virtual machine may instruct, by means of alarming, to manually complete restart or migration of the virtual machine, or run dedicated migration software to perform restart or migration. The faulty virtual machine may work properly again by means of restart. A configuration file and a disk file of the faulty virtual machine may be copied from a source host into a target host by means of migration, so that the faulty virtual machine can work again on the target host.

Optionally, in another embodiment, the method in FIG. 2 further includes: when the first virtual machine determines that the status of the second virtual machine is faulty and the second virtual machine cannot be restarted, the first virtual machine triggers the second virtual machine to be migrated from a source host on which the second virtual machine is located to a target host, where the source host is a faulty host, and the target host is a normal host.

Optionally, the first virtual machine receives information sent by the migrated second virtual machine, to update information about the migrated second virtual machine. That the first virtual machine sends first synchronization information to the at least two neighboring virtual machines includes: the first virtual machine sends the first synchronization information to the at least two neighboring virtual machines, where the first synchronization information includes the information about the migrated second virtual machine, so that the at least two neighboring virtual machines of the first virtual machine update the information about the migrated second virtual machine.

For example, each virtual machine in the virtual machine cluster may instruct, when determining that a status of another virtual machine is faulty, a physical host on which the faulty virtual machine is located to restart the virtual machine. If the virtual machine determines that the faulty virtual machine cannot be restarted, the virtual machine sends a migration indication. For example, if after a preset time (for example, the preset time may be greater than a time for restarting the virtual machine) has elapsed since sending of a restart command, the virtual machine does not receive a heartbeat message sent by the faulty virtual machine, it is considered that the faulty virtual machine cannot be restarted. In this case, the faulty virtual machine may be migrated to another physical host, that is, the faulty virtual machine is restarted on the another physical host. The foregoing preset time is set, so that when the faulty virtual machine can be successfully restarted, a neighbor relationship of the virtual machine cluster remains unchanged, and therefore, there is no need to determine a neighbor relationship again.

It should be understood that after being restarted, the faulty virtual machine can still keep an original neighbor relationship, or determine a neighbor relationship again. When the neighbor relationship is determined again, information synchronization may be performed by using synchronization information.

Optionally, in another embodiment, the method in FIG. 2 further includes: when the first virtual machine determines that the status of the second virtual machine is a left state, the first virtual machine triggers the second virtual machine to be deleted from the source host on which the second virtual machine is located.

For example, each virtual machine in the virtual machine cluster may instruct, when determining that a status of another virtual machine is a left state, to delete the virtual machine. For example, the virtual machine may instruct, by means of alarming, to manually complete deletion of the virtual machine, or run dedicated migration software to perform deletion. For example, a configuration file and a disk file of the faulty virtual machine may be deleted from a source host.

Optionally, the first virtual machine may delete information about the second virtual machine that is stored in the virtual machine list. That the first virtual machine sends first synchronization information to the at least two neighboring virtual machines includes: the first virtual machine sends the first synchronization information to the at least two neighboring virtual machines of the first virtual machine, where the first synchronization information includes instruction information used to instruct to delete the second virtual machine, so that the at least two neighboring virtual machines of the first virtual machine delete the information about the second virtual machine.

For example, if a virtual machine is manually stopped from running, it indicates that the virtual machine is no more used and can be deleted from the virtual machine cluster. In this case, after learning that the virtual machine leaves, a neighboring virtual machine of the virtual machine that has left may delete information about the virtual machine that has left from a stored virtual machine list, so as to trigger another virtual machine to delete the information about the virtual machine that has left from a stored virtual machine list.

Optionally, in another embodiment, the method in FIG. 2 further includes: the first virtual machine sends the result of detecting the second heartbeat message to an upper-layer node of the N virtual machines, so that the upper-layer node determines the status of the second virtual machine according to the result of detecting the second heartbeat message and the result of detecting the heartbeat message sent by the second virtual machine to the another neighboring virtual machine of the second virtual machine; and the first virtual machine receives an indication message sent by the upper-layer node, where the indication message is used to indicate the status of the second virtual machine.

According to this embodiment of the present disclosure, multiple neighboring virtual machines of each virtual machine may report results of detecting a heartbeat message to the upper-layer node (for example, a management node), and a status of the virtual machine may be determined by using multiplethe detection results of the multiple neighboring virtual machines. In this way, the status of the virtual machine is determined more accurately. For example, all neighboring virtual machines of each virtual machine detect one heartbeat message sent by the virtual machine, and report detection results to the upper-layer node. When determining that none of the neighboring virtual machines of the virtual machine detects a heartbeat message within a preset time, the upper-layer node may determine that the virtual machine is faulty or leaves, and notify all the neighboring virtual machines of the virtual machine of information that the virtual machine is faulty or leaves. In this way, it can be determined, by detecting one heartbeat message sent by a virtual machine, whether the virtual machine is faulty or leaves, so that a faulty virtual machine or a virtual machine that has left can be found accurately and promptly. In a conventional technology in which a master/slave architecture is used, a master node needs to accurately find a faulty or leaving node according to multiple heartbeat messages sent by a slave node, and consequently, the faulty or leaving node cannot be found promptly.

Optionally, in another embodiment, the method in FIG. 2 further includes: the first virtual machine receives the detection result of detecting, by the another neighboring virtual machine of the second virtual machine, the heartbeat message sent by the second virtual machine; and the first virtual machine determines the status of the second virtual machine according to the result of detecting the second heartbeat message and the detection result of detecting, by the another neighboring virtual machine of the second virtual machine, the heartbeat message sent by the second virtual machine.

For example, neighboring virtual machines of each virtual machine may determine a status (for example, a faulty or left state) of the virtual machine according to a heartbeat message sent by the virtual machine. In addition, each neighboring virtual machine of the virtual machine may receive, from another neighboring virtual machine of the virtual machine, a status that is of the virtual machine and that is detected by the another neighboring virtual machine, and determine the status of the virtual machine according to the detection. For example, if each neighboring virtual machine of the virtual machine detects that the virtual machine is faulty, and also receives a message that is sent by another neighboring virtual machine and that indicates that the another neighboring virtual machine detects that the virtual machine is faulty, it may be determined that the virtual machine is faulty. Each neighboring virtual machine of a virtual machine may actively send a detection result to another neighboring virtual machine when detecting no heartbeat message within a preset time; or periodically send a detection result to another neighboring virtual machine. This is not limited in this embodiment of the present disclosure. For example, each neighboring virtual machine may actively request to send a detection result to another neighboring virtual machine when detecting no heartbeat message within a preset time.

In a process of initially establishing a virtual machine cluster according to this embodiment of the present disclosure, each node needs to learn virtual machines in the virtual machine cluster and information related to the virtual machines, and then determines, based on the above, virtual machines that can be neighbors of the node.

Optionally, in another embodiment, the method in FIG. 2 further includes: when the first virtual machine is added to the virtual machine cluster, the first virtual machine sends information about the first virtual machine to another virtual machine in the N virtual machines; and the first virtual machine receives respective information sent by the another virtual machine in the N virtual machines.

Specifically, communication may be performed between virtual machines by using a P2P protocol, for example, a gossip protocol. A gossip process is a timing program. In this embodiment of the present disclosure, the process may be used to randomly select a specific quantity of (for example, three) other virtual machines every other second from a locally maintained virtual machine list for communication, so as to exchange respective information. In this manner, a process of establishing an entire cluster is entirely self-organized and a configuration phase is reduced.

Optionally, in another embodiment, the method in FIG. 2 further includes: when the first virtual machine is added to the virtual machine cluster, the first virtual machine sends registration information to an index server, where the registration information includes information about the first virtual machine, and the index server is a registration center of the virtual machine cluster and is configured to provide a registration service for a virtual machine in the virtual machine cluster; and the first virtual machine receives information about another virtual machine in the N virtual machines that is sent by the index server.

For example, when all virtual machine nodes in the virtual machine cluster are started and are initially added to the cluster, the nodes register information about the nodes on the index server, and obtain information about another virtual machine in the current cluster from the server. It should be understood that the index server may be a separate node, or may be a virtual machine in the cluster, for example, the 1st virtual machine that is added to the cluster.

It should be understood that according to this embodiment of the present disclosure, information about all virtual machines may be configured on each virtual machine by an administrator by using a configuration tool, and then, each virtual machine learns a neighboring virtual machine of the virtual machine by means of calculation according to a specific neighbor relationship algorithm, and establishes a neighbor relationship with the neighboring virtual machine. In this manner, node information of a cluster can be rapidly obtained, and many disadvantages existing during a hello packet broadcast can be avoided.

To make persons skilled in the art understand the present disclosure better, the following further describes the present disclosure with reference to specific embodiments. It may be understood that the specific embodiments are merely intended to help to better understand the technical solutions of the present disclosure, but are not intended to limit the technical solutions of the present disclosure.

FIG. 3 is a schematic diagram of a neighbor relationship of a virtual machine cluster 300 according to an embodiment of the present disclosure. The virtual machine cluster 300 in FIG. 3 is used as an example, and the first virtual machine in the embodiment in FIG. 2 may be any virtual machine in the cluster 300.

It is assumed that a first virtual machine in this specific embodiment is a VM 301. It may be learned that the VM 301 establishes a neighbor relationship with a VM 302 and a VM 304. Therefore, neighboring virtual machines of the VM 301 are the VM 302 and the VM 304. A second virtual machine may be any virtual machine in the VM 302 and the VM 304. It is assumed that the second virtual machine in this specific embodiment is the VM 302.

It is assumed that the first virtual machine, that is, the VM 301 stores management information of the VM 301, management information of the VM 304, and management information of a VM 307. In the management information of the VM 301 that is stored in a first node list of the VM 301, a quantity of times of starting the VM 301 is 2 and a heartbeat value of the VM 301 is 8. In the management information of the VM 304 that is stored in the first node list, a quantity of times of starting the VM 304 is 3 and a heartbeat value of the VM 304 is 3. In the management information of the VM 307 that is stored in the first node list, a quantity of times of starting the VM 307 is 1 and a heartbeat value of the VM 307 is 9.

It is assumed that the second virtual machine, that is, the VM 302 stores management information of the VM 302, management information of the VM 301, and management information of the VM 303. In the management information of the VM 301 that is stored in a second node list of the VM 302, a quantity of times of starting the VM 301 is 2 and a heartbeat value of the VM 301 is 2. In the management information of the VM 302 that is stored in the second node list, a quantity of times of starting the VM 302 is 3 and a heartbeat value of the VM 302 is 3. In the management information of the VM 303 that is stored in the second node list, a quantity of times of starting the VM 303 is 1 and a heartbeat value of the VM 303 is 5.

In addition, virtual machine management information stored in the first virtual machine and the second virtual machine further includes virtual machine identifiers. For ease of description, it is assumed that in this embodiment, an identifier of each virtual machine is a number corresponding to the virtual machine in the cluster 300, for example, an identifier of the VM 301 is "VM 301".

Further, configuration information of the first virtual machine may include configuration information (ClusterConf) of a cluster to which the first virtual machine belongs and node information (NodeInf) of the first virtual machine. Likewise, configuration information of the second virtual machine may include configuration information of a cluster to which the second virtual machine belongs and node information of the second virtual machine. In this embodiment, in the configuration information of the first virtual machine, the ClusterConf may be 0 and the NodeInf may be 1. In the configuration information of the second virtual machine, the ClusterConf may be 1 and the NodeInf may be 0. A larger value of the ClusterConf indicates a newer value of the ClusterConf, and a larger value of the NodeInf indicates a newer value of the NodeInf.

The first virtual machine may send, to the second virtual machine, the management information of the three virtual machines that is stored in the first node list and the configuration information of the first virtual machine. After receiving the information, the second virtual machine maintains, according to the management information of the three virtual machines, the virtual machine management information stored in the second virtual machine.

Specifically, the second virtual machine may compare the management information of the three virtual machines with the management information of the three virtual machines that is stored in the second virtual machine, to determine whether there is a virtual machine whose management information needs to be updated in the virtual machine management information stored in the second virtual machine. Because in the management information of the VM 301, the quantity of times of starting is 2 and the heartbeat value is 8, and in the management information of the VM 301 that is stored in the second virtual machine, the quantity of times of starting is 2 and the heartbeat value is 2, the second virtual machine may determine that the management information of the VM 301 is newer than the management information stored in the second virtual machine. In addition, the second virtual machine may further determine the management information of the VM 304 and the management information of the VM 307, and management information of a VM 304 and the management information of the VM 307 are not in the virtual machine management information stored in the second virtual machine.

When determining that the management information of the VM 301 is newer than the management information stored in the second virtual machine, the second virtual machine updates the stored management information of the VM 301 to the management information of the VM 301. In addition, the second virtual machine may store the management information of the VM 304 and the management information of the VM 307.

Further, the second virtual machine may further determine that there is no management information of the VM 302 and management information of the VM 303 in the information received from the first virtual machine. The second virtual machine may send the management information of the VM 302 and the management information of the VM 303 to the first virtual machine, so that the first virtual machine stores the management information of the VM 302 and the management information of the VM 303.

The second virtual machine may maintain the configuration information of the second virtual machine according to the configuration information of the first virtual machine. In this specific embodiment, if the second virtual machine determines that the ClusterConf in the configuration information of the first virtual machine is less than the ClusterConf in the configuration information of the second virtual machine, the second virtual machine may determine that the ClusterConf in the configuration information of the second virtual machine is newer. If the second virtual machine determines that the NodeInf in the configuration information of the first virtual machine is greater than the NodeInf in the configuration information of the second virtual machine, the second virtual machine may determine that the NodeInf in the configuration information of the first virtual machine is newer. In this case, the second virtual machine may keep the ClusterConf in the configuration information of the second virtual machine unchanged, and update the NodeInf in the configuration information of the second virtual machine to the NodeInf in the configuration information of the first virtual machine.

When determining that the configuration information of the second virtual machine is newer than the configuration information of the first virtual machine, the second virtual machine may send the configuration information of the second virtual machine to the first virtual machine. After receiving the configuration information of the second virtual machine, the first virtual machine may update the configuration information of the first virtual machine according to the configuration information of the second virtual machine. A process of updating the configuration information by the first virtual machine is similar to the process of updating the configuration information by the second virtual machine, and details are not repeatedly described herein.

After the foregoing process, content in virtual machine management information maintained by the first virtual machine is identical with content in virtual machine management information maintained by the second virtual machine, and configuration information of the first virtual machine is also identical with that of the second virtual machine. Similarly, each virtual machine in the cluster 300 may perform the foregoing process with a corresponding virtual machine. In this way, when no master node is required, each virtual machine in the cluster 300 stores management information of another virtual machine, and configuration information stored in all the virtual machines is the same. Therefore, problems, caused by a down host of a master node, that a recovery time is extremely long, and a split-brain case occurs in a cluster can be avoided.

The foregoing describes in detail the method for processing a virtual machine cluster according to the embodiment of the present disclosure. With reference to specific examples, the following separately describes processes of initially establishing, monitoring, and managing a virtual machine cluster according to an embodiment of the present disclosure.

In a process of initially establishing a virtual machine cluster according to this embodiment of the present disclosure, each virtual machine needs to learn virtual machines in the virtual machine cluster and information related to the virtual machines, and then determines, based on the above, virtual machines that can be neighbors of the virtual machine.

In this embodiment, an initially established virtual machine list may include status information (for example, a central processing unit CPU) usage and memory usage), management information (information such as a heartbeat value and a quantity of times of starting), and configuration information (for example, an IP address of a virtual machine). For example, after a virtual machine cluster is initially established, a virtual machine list is shown in Table 1.

TABLE 1

| Virtual machine ID | Heartbeat value | Quantity of times of starting | CPU usage | Memory usage | IP address | ... |
|---|---|---|---|---|---|---|
| 101 | 50 | 1 | 10% | 10% | 190.158.101.2 | ... |
| 102 | 10 | 2 | 15% | 5% | 190.158.101.10 | ... |
| 103 | 45 | 1 | 5% | 5% | 190.158.102.8 | ... |
| 104 | ... | ... | ... | ... | ... | ... |
| 105 | ... | ... | ... | ... | ... | ... |
| 106 | ... | ... | ... | ... | ... | ... |
| ... | ... | ... | ... | ... | ... | ... |

In this embodiment of the present disclosure, a virtual machine cluster may be initially established by means of a broadcast, manual configuration, or an index server.

When the virtual machine cluster is established by means of a broadcast, each virtual machine may broadcast a hello message. After receiving the hello message, another virtual machine returns a hello packet acknowledgement message to the virtual machine, so that status information, management information, and/or configuration information are or is exchanged between the two virtual machines.

Figure 4:
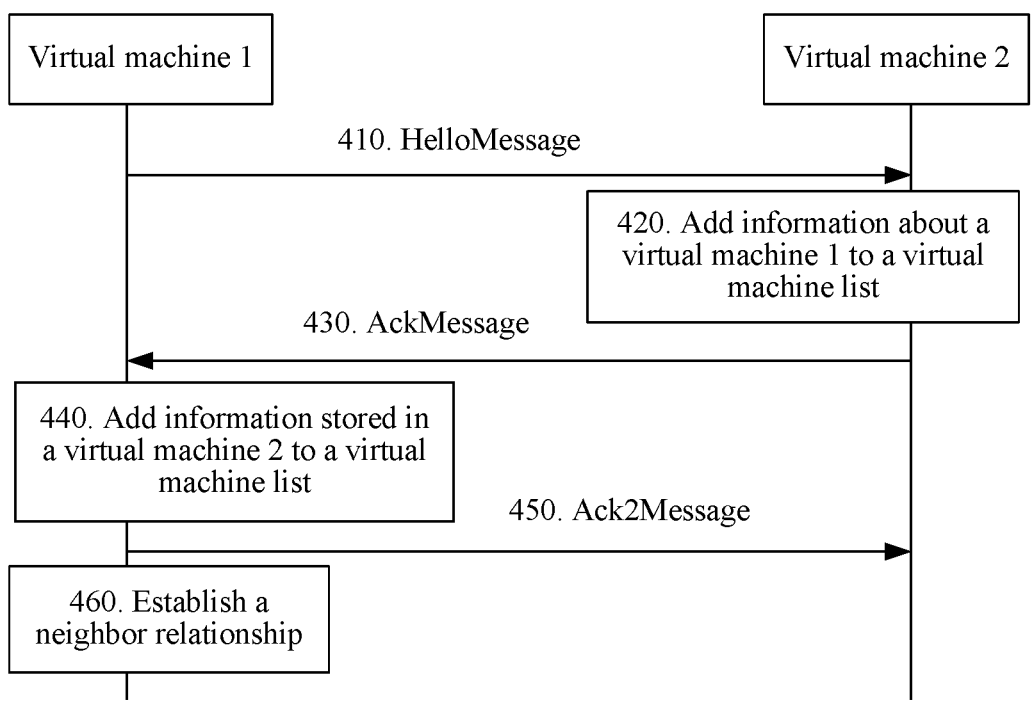
FIG. 4 is a schematic flowchart of a process of establishing a virtual machine cluster according to an embodiment of the present disclosure.

FIG. 4 is a schematic flowchart of a process of establishing a virtual machine cluster according to an embodiment of the present disclosure.

Referring to FIG. 4, a specific process of establishing a virtual machine cluster by means of a broadcast is as follows.

410. A virtual machine 1 broadcasts a HelloMessage (hello packet), where the HelloMessage includes information about the virtual machine, for example, status information, management information, and/or configuration information.

420. A virtual machine 2 receives the HelloMessage sent by the virtual machine 1, reads the information about the virtual machine 1 from the HelloMessage, and adds the virtual machine 1 to a local virtual machine list, that is, records, in the local virtual machine list, an ID of the virtual machine 1 and the status information, the management information, and/or the configuration information of the virtual machine 1.

430. The virtual machine 2 returns an acknowledgement message AckMessage (acknowledgement packet) to the virtual machine 1, where the AckMessage includes virtual machine information stored in the virtual machine 2.

440. The virtual machine 1 receives the AckMessage from the virtual machine 2, extracts the virtual machine information stored in the virtual machine 2 from the AckMessage, and adds, to a locally stored virtual machine list, the virtual machine information stored in the virtual machine 2.

450. The virtual machine 1 returns an Ack2Message (acknowledgement 2 packet) to the virtual machine 2, to acknowledge message synchronization with the virtual machine 2, where the Ack2Message includes the locally added virtual machine information.

460. The virtual machine 1 may learn, by means of calculation, a neighbor of the virtual machine 1 according to the virtual machine list by using a specific neighbor relationship algorithm, and establish a neighbor relationship with the neighbor of the virtual machine 1.

Each virtual machine may locally generate a virtual machine list when a virtual machine cluster is being established. Then, each virtual machine may learn, by means of calculation, a neighbor of the virtual machine according to the virtual machine list by using a specific neighbor relationship algorithm, and establish a neighbor relationship with the neighbor. For example, each virtual machine may further add information about a neighboring virtual machine of the virtual machine to an initially established virtual machine list. Each virtual machine may learn, by means of calculation, a neighboring virtual machine according to the virtual machine list in Table 1 by using a specific neighbor relationship algorithm. Each virtual machine may notify another virtual machine of the neighboring virtual machine determined by the virtual machine, or each virtual machine may learn, by means of calculation, neighboring virtual machines of all the virtual machines according to the virtual machine list by using a same algorithm. For example, after a neighbor relationship is determined, a virtual machine list is shown in Table 2.

TABLE 2

| Virtual machine ID | Heartbeat value | Quantity of times of starting | CPU usage | Memory usage | IP address | Neighboring virtual machine |
|---|---|---|---|---|---|---|
| 101 | 50 | 1 | 10% | 10% | 190.158.101.2 | 102, 105, 106, 103 |
| 102 | 10 | 2 | 15% | 5% | 190.158.101.10 | 101, 104, 105 |
| 103 | 45 | 1 | 5% | 5% | 190.158.102.8 | 101, 104, 105 |
| 104 | ... | ... | ... | ... | ... | ... |
| 105 | ... | ... | ... | ... | ... | ... |
| 106 | ... | ... | ... | ... | ... | ... |
| ... | ... | ... | ... | ... | ... | ... |

After the foregoing process, each virtual machine in a virtual machine cluster may learn existence of another virtual machine in the cluster, and status information, management information, and/or configuration information of the another virtual machine, so that a global information list of the virtual machine cluster is locally formed in each virtual machine. In this manner, a process of establishing an entire cluster is entirely self-organized and a configuration phase is reduced.

It should be understood that when a P2P protocol is used to establish a virtual machine cluster, a gossip protocol in the P2P protocol may be used. By means of exchange by using the gossip protocol, each P2P node may know all other nodes or may know only several neighboring nodes. The nodes have consistent statuses provided that the nodes can be connected by using a network.

Alternatively, in another embodiment, when a virtual machine cluster is established by means of manual configuration, an administrator may configure status information, management information, and/or configuration information of each virtual machine on all the virtual machines by using a configuration tool. In this manner, each virtual machine in the virtual machine cluster can rapidly learn status information, management information, and/or configuration information of the virtual machine cluster.

Alternatively, in another embodiment, when a virtual machine cluster is established by means of an index server, the index server is equivalent to a registration center. When being started and initially added to the cluster, each virtual machine in the virtual machine cluster registers status information, management information, and/or configuration information of the virtual machine on the index server, and obtains status information, management information, and/or configuration information of another virtual machine in the virtual machine cluster from the index server. It should be understood that the index server may be a separate physical node or a host, or may be a virtual machine in the virtual machine cluster, for example, the $1^{st}$ virtual machine that is added to the cluster.

It should be understood that in a process of establishing a virtual machine cluster, when all virtual machines in the virtual machine cluster are added to the virtual machine cluster one by one, a neighbor relationship of each virtual machine may dynamically change. For example, the $2^{nd}$ added virtual machine may use the $1^{st}$ added virtual machine as a neighbor, and the $3^{rd}$ added virtual machine may use the $2^{nd}$ added virtual machine as a neighbor. As added virtual machines increase, the $3^{rd}$ added virtual machine may select another virtual machine as a neighbor.

Figure 5:
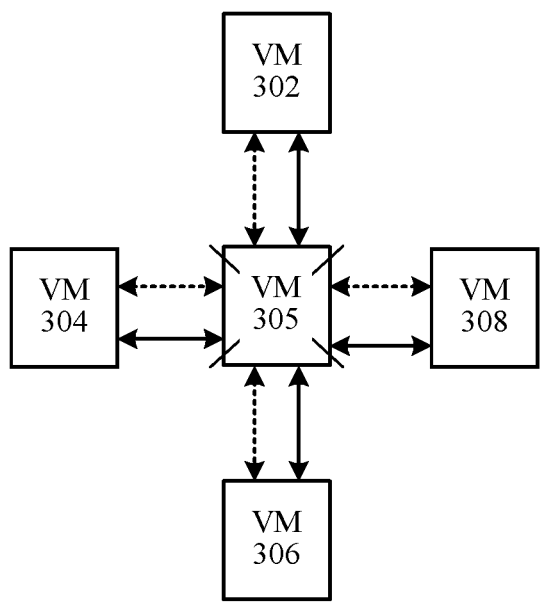
FIG. 5 is a schematic diagram of a heartbeat detection mechanism according to an embodiment of the present disclosure.

FIG. 5 is a schematic diagram of a heartbeat detection mechanism according to an embodiment of the present disclosure.

After a virtual machine cluster is established by using the methods in the foregoing embodiments, each virtual machine determines a respective neighbor relationship. Generally, one virtual machine has two to six neighboring virtual machines. Virtual machines monitor each other by using a rapid heartbeat mechanism. In this way, any virtual machine is simultaneously monitored by multiple neighboring virtual machines. Provided that the virtual machine is faulty, the multiple neighboring virtual machines of the virtual machine simultaneously detect that the virtual machine is faulty. This is a multi-point detection mechanism. By means of multi-point detection, a fault detection time can be shortened by using a concept of trading space for time. For example, referring to FIG. 5, if neighboring virtual machines 302, 304, 306, and 308 of a VM 305 detect, within a preset time (for example, the preset time may be greater than a heartbeat message sending interval and less than two heartbeat message sending intervals), no heartbeat message sent by the VM 305, it is considered that the virtual machine VM 305 is faulty or leaves.

To improve detection accuracy and avoid misinformation, in a conventional heartbeat detection mechanism, a detection node needs to perform an acknowledgement mechanism for multiple times before determining whether a detected node is faulty. For example, the detection node continuously loses three heartbeats and then considers that the detected node is faulty. However, according to this embodiment of the present disclosure, it can be determined, by using a mechanism of simultaneous multi-point detection and a mechanism of trading space for time, that a detected node is faulty when one heartbeat is lost. Because of the simultaneous multi-point detection, misinformation can be effectively avoided, and high accuracy can be ensured while a detection time is shortened.

Figure 6:
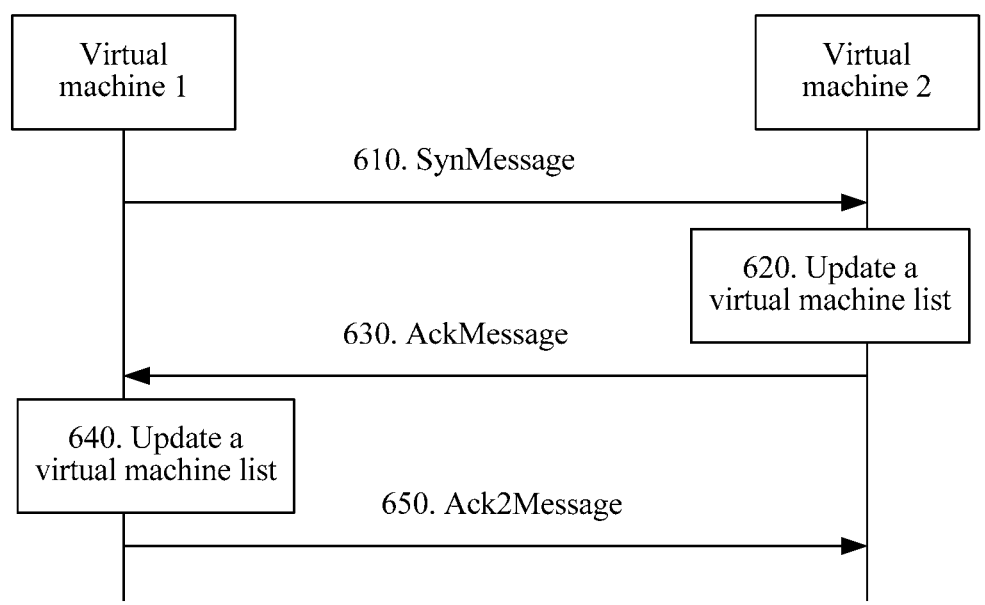
FIG. 6 is a schematic flowchart of inter-virtual machine synchronization according to an embodiment of the present disclosure.

FIG. 6 is a schematic flowchart of inter-virtual machine synchronization according to an embodiment of the present disclosure.

There is no center node in a virtual machine cluster in this embodiment of the present disclosure. A virtual machine list in the virtual machine cluster and other related status information, management information, and/or configuration information need to be maintained by each virtual machine in the virtual machine cluster, and data consistency is achieved by means of inter-virtual machine synchronization. Status information, management information, and/or configuration information may be synchronized between the virtual machines in two manners.

(1) Periodical Timing Synchronization

The virtual machines in the virtual machine cluster synchronize the status information, the management information, and/or the configuration information according to a specified time interval or period.

(2) Event-Triggered Synchronization

The virtual machines in the virtual machine cluster trigger synchronization of the status information, the management information, and/or the configuration information only when the status information, the management information, and/or the configuration information of the virtual machines change or changes.

For example, a process of initiating message synchronization with a virtual machine 2 by a virtual machine 1 includes the following content.

610. The virtual machine 1 sends a synchronization message to the virtual machine 2.

Specifically, the synchronization message may be a SynMessage (synchronization packet). The SynMessage may include information about updated content in a virtual machine list stored in the virtual machine 1. For example, the updated content in the virtual machine list may be sent to the virtual machine 2 by using the SynMessage, or an index corresponding to the updated content may be sent to the virtual machine 2 by using the SynMessage. In this embodiment of the present disclosure, the virtual machine 2 may be a neighboring virtual machine of the virtual machine 1. The virtual machine 1 may send the SynMessage to all neighboring virtual machines of the virtual machine 1.

620. The virtual machine 2 updates a local virtual machine list according to the synchronization message.

For example, if the synchronization message includes updated status information, management information, and/or configuration information, after receiving the synchronization message, the virtual machine 2 compares the updated status information, management information, and/or configuration information included in the synchronization message with locally stored status information, management information, and/or configuration information, to determine which virtual machine stores newer status information, management information, and/or configuration information. If the virtual machine 2 determines that the status information, the management information, and/or the configuration information stored in the virtual machine 1 are/is newer, the virtual machine 2 updates the locally stored virtual machine list according to the newer status information, management information, and/or configuration information. The synchronization message may be the SynMessage.

630. The virtual machine 2 returns an acknowledgement message to the virtual machine 1.

If the locally stored status information, management information, and/or configuration information are/is newer, the locally stored status information, management information, and/or configuration information are/is fed back to the virtual machine 1 by using the acknowledgement message. The acknowledgement message may be an AckMessage.

It should be understood that status information, management information, and/or configuration information of some virtual machines may be newer in each of the virtual machine lists of the two virtual machines.

640. The virtual machine 1 updates a local virtual machine list according to the acknowledgement message.

After receiving the AckMessage, the virtual machine 1 updates the local virtual machine list according to the status information, management information, and/or configuration information that are/is included in the Ackmessage and that are/is stored in the virtual machine 2.

650. The virtual machine 1 sends an acknowledgement message to the virtual machine 2.

Alternatively, if the synchronization message includes indication information of the updated status information, management information, and/or configuration information (for example, indexes or an index of the updated status information, management information, and/or configuration information), after receiving the synchronization message, the virtual machine 2 compares the received indication information of the updated status information, management information, and/or configuration information with indication information of the locally stored status information, management information, and/or configuration information, to determine which virtual machine stores newer status information, management information, and/or configuration information. If the virtual machine 2 determines that the status information, the management information, and/or the configuration information stored in the virtual machine 2 are/is newer, the virtual machine 2 sends an acknowledgement message to the virtual machine 1. The acknowledgement message includes indication information for requesting, by the virtual machine 2, the updated status information, management information, and/or configuration information in the virtual machine 1, to request the virtual machine 1 to send the updated status information, management information, and/or configuration information to the virtual machine 2. The acknowledgement message is an Ack2Message. After receiving the Ack2Message, the virtual machine 2 may update the locally stored status information, management information, and/or configuration information according to the updated status information, management information, and/or configuration information stored in the virtual machine 1.

It should be understood that when a P2P protocol is used in this embodiment of the present disclosure, a message synchronization function may be implemented by performing a gossip process. For example, two virtual machines may exchange status information, management information, and/or configuration information by using a GossipSynMessage, a GossipAckMessage, and a GossipAck2Message.

The foregoing examples describe in detail processes of initially establishing and monitoring a virtual machine cluster according to the embodiments of the present disclosure. The following describes in detail another process of managing a virtual machine cluster according to an embodiment of the present disclosure.

Management on a virtual machine cluster includes the following aspects: of the virtual machine cluster, adding of a new virtual machine, a fault or restart of a virtual machine, migration of a virtual machine, leaving of a virtual machine, and the like.

A process of adding a new virtual machine is similar to a process of initially establishing a virtual machine cluster. The newly added virtual machine may also obtain global information of the virtual machine cluster, that is, status information, management information, and/or configuration information of all virtual machines in three manners: by means of a broadcast, manual configuration, and an index server, then, find a neighbor of the newly added virtual machine by using a neighbor relationship algorithm in the newly added virtual machine, and add the newly added virtual machine to the virtual machine cluster.

When a virtual machine is faulty, the virtual machine may be restarted first. If the virtual machine is not successfully restarted, the virtual machine may be re-established on another physical host, that is, the virtual machine is migrated.

Therefore, when it is detected that a virtual machine is faulty, to avoid a flapping problem that is of a structure of the virtual machine cluster and that is caused by adding the virtual machine to the virtual machine cluster again after the virtual machine is successfully restarted, waiting of a period of time (for example, a time for restarting the virtual machine) is required when it is detected that the virtual machine is faulty. If the faulty virtual machine is successfully restarted, the virtual machine still returns to an original location in the virtual machine cluster. The entire cluster does not need to be reconfigured or synchronized. That is, when a virtual machine is faulty or restarted, the virtual machine is not deleted from a virtual machine list. In this case, the virtual machine is still continuously monitored by using a fault detection mechanism (for example, a heartbeat) of virtual machines in the virtual machine cluster, so as to determine whether the virtual machine is recovered. Reconfiguration or synchronization of the entire cluster is triggered only when the virtual machine is not successfully restarted.

When a virtual machine leaves the virtual machine cluster, another virtual machine may learn, by performing a synchronization process, that the virtual machine leaves, so as to update a respective local virtual machine list.

Further, to help virtual machine management and improve virtual machine communication efficiency, classifying virtual machines in a virtual machine cluster may be considered. Generally, the virtual machines may be classified into three categories: a seed virtual machine, a general virtual machine, and an unreachable virtual machine.

The seed virtual machine is mainly configured to provide an initial virtual machine list for a virtual machine that is newly added to the virtual machine cluster. The unreachable virtual machine refers to virtual machines that are found temporarily unreachable by using a virtual machine detection mechanism, and includes a faulty virtual machine, a virtual machine being restarted, and the like. The general virtual machine is a virtual machine in the virtual machine cluster other than the seed virtual machine and the unreachable virtual machine.

If the foregoing virtual machine classification manner is used, a communication manner may also change accordingly. That is, an original manner of randomly selecting (three by default) virtual machines is changed to a manner of selecting one virtual machine from each of the foregoing three types of virtual machines. In this way, survivability of the seed virtual machine can be ensured, so that a virtual machine that is newly added to the cluster obtains an initial virtual machine list; and virtual machines that are temporarily unreachable for various reasons are always being monitored, so that after being recovered, the temporarily unreachable virtual machines can be learned promptly by another virtual machine. For example, when a virtual machine is newly added to a cluster, a virtual machine list may be first obtained from a seed virtual machine. Then, the virtual machine may synchronize status information, management information, and/or configuration information with another virtual machine according to the virtual machine list.

When the foregoing classification is not performed on virtual machines in the virtual machine cluster, a virtual machine that is newly added to the cluster may obtain node information from another virtual machine by sending a broadcast message, to re-establish a local node list of the virtual machine. After receiving the broadcast message, the another virtual machine in the virtual machine cluster may return status information, management information, and/or configuration information of the another virtual machine to the newly added virtual machine, and update the local status information, the management information, and/or the configuration information.

Figure 7:
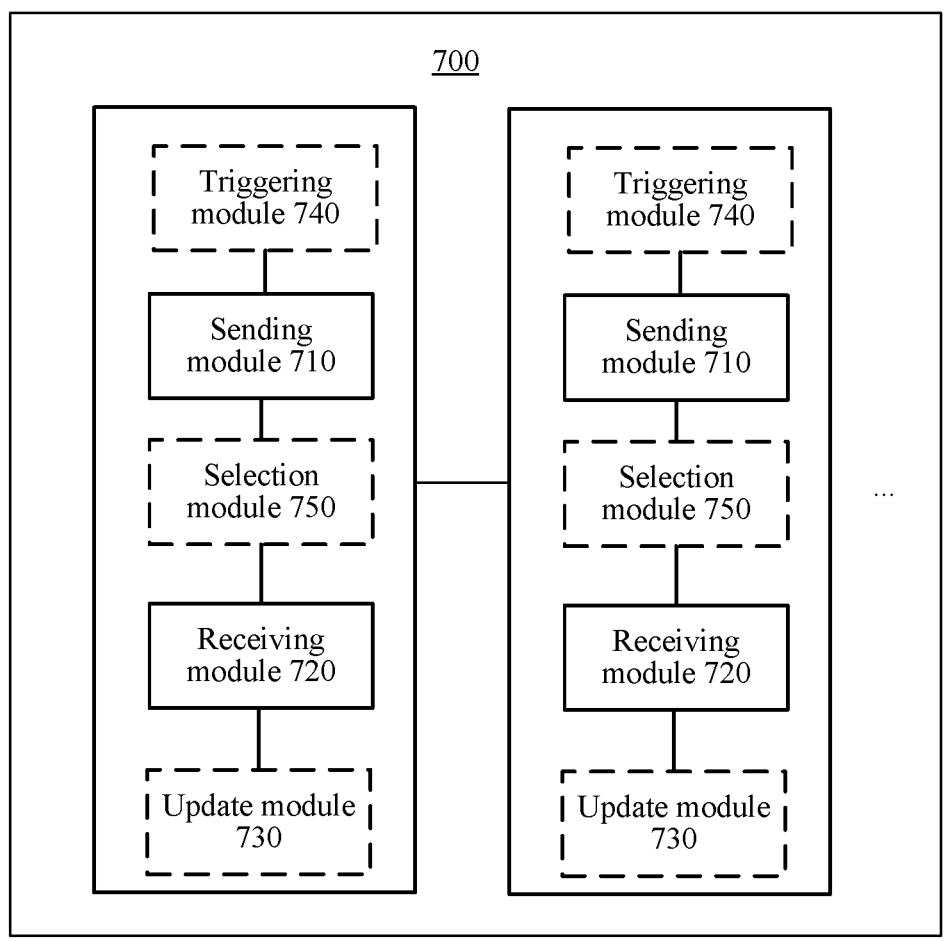
FIG. 7 is a schematic structural diagram of a computer system according to an embodiment of the present disclosure.

FIG. 7 is a schematic structural diagram of a computer system 700 according to an embodiment of the present disclosure. The computer system 700 includes a physical hardware layer of at least one computer node. A virtual machine cluster runs at the physical hardware layer of the at least one computer node, and the virtual machine cluster includes N virtual machines. Each virtual machine in the N virtual machines stores a virtual machine list and works as a first virtual machine in a peer-to-peer manner. The virtual machine list includes information about the N virtual machines, and the first virtual machine includes:

a sending module 710, configured to send a first heartbeat message to at least two neighboring virtual machines in the N virtual machines, so that the at least two neighboring virtual machines detect the first heartbeat message, where a result of detecting the first heartbeat message is used to determine a status of the first virtual machine, and the first virtual machine establishes a neighbor relationship with the at least two neighboring virtual machines according to the information about the N virtual machines; and a receiving module 720, configured to detect a second heartbeat message sent by a second virtual machine in the at least two virtual machines, where the first virtual machine is a neighboring virtual machine of the second virtual machine, and a result of detecting the second heartbeat message and a detection result of detecting, by another neighboring virtual machine of the second virtual machine, a heartbeat message sent by the second virtual machine are used to determine a status of the second virtual machine.

According to this embodiment of the present disclosure, each virtual machine in a virtual machine cluster may determine at least two neighboring virtual machines according to a virtual machine list stored in the virtual machine, and each virtual machine in the virtual machine cluster may send a heartbeat message to the at least two neighboring virtual machines of the virtual machine, so as to determine a status of the virtual machine according to detection results of the at least two neighboring virtual machines. Because a status of each virtual machine may be determined according to a result of detecting, by a neighboring virtual machine of the virtual machine, a heartbeat message sent by the virtual machine, a problem, existing in a master/slave architecture, that a master becomes a bottleneck of an entire cluster is avoided. In addition, because a master host is not re-elected, in a virtual machine cluster for which this solution is used to determine a status, a fault recovery time is not prolonged and no contention for resources occurs, and a fault tolerance capability and performance of the virtual machine cluster are improved.

Optionally, in another embodiment, the sending module 710 further sends first synchronization information to the at least two neighboring virtual machines, where the first synchronization information is used to indicate an update of the virtual machine list stored in the first virtual machine, so that the at least two neighboring virtual machines update their respective virtual machine lists stored therein; the receiving module 720 further receives second synchronization information sent by the second virtual machine, where the second synchronization information is used to indicate an update of a virtual machine list stored in the second virtual machine; and the first virtual machine further includes an update module 730, configured to update, according to the second synchronization information, the virtual machine list stored in the first virtual machine.

Optionally, in another embodiment, the at least two neighboring virtual machines include two to six virtual machines that are in the N virtual machines and that have a capability of exchanging information directly with the first virtual machine.

Optionally, in another embodiment, the computer system 700 includes a triggering module 740, configured to: when it is determined that the status of the second virtual machine is faulty, trigger the second virtual machine to be restarted, or trigger the second virtual machine to be migrated from a source host of the second virtual machine to a target host, where the source host is a faulty host, and the target host is a normal host.

Optionally, in another embodiment, the computer system 700 includes a triggering module 740, configured to: when it is determined that the status of the second virtual machine is faulty and the second virtual machine cannot be restarted, the first virtual machine triggers the second virtual machine to be migrated from a source host on which the second virtual machine is located to a target host, where the source host is a faulty host, and the target host is a normal host.

Optionally, in another embodiment, the computer system 700 includes the triggering module 740, configured to: when it is determined that the status of the second virtual machine is a left state, trigger the second virtual machine to be deleted from the source host on which the second virtual machine is located.

Optionally, in another embodiment, the sending module 710 further sends the result of detecting the second heartbeat message to an upper-layer node of the N virtual machines, so that the upper-layer node determines the status of the second virtual machine according to the result of detecting the second heartbeat message and the result of detecting the heartbeat message sent by the second virtual machine to the another neighboring virtual machine of the second virtual machine; and the receiving module 720 further receives an indication message sent by the upper-layer node, where the indication message is used to indicate the status of the second virtual machine.

Optionally, in another embodiment, the receiving module 720 further receives the detection result of detecting, by the another neighboring virtual machine of the second virtual machine, the heartbeat message sent by the second virtual machine; and the receiving module 720 further determines the status of the second virtual machine according to the result of detecting the second heartbeat message and the detection result of detecting, by the another neighboring virtual machine of the second virtual machine, the heartbeat message sent by the second virtual machine.

Optionally, in another embodiment, when the first virtual machine is added to the virtual machine cluster, the sending module 710 further sends information about the first virtual machine to another virtual machine in the N virtual machines; and the receiving module 720 further receives respective information sent by the another virtual machine in the N virtual machines, so as to generate the virtual machine list.

Optionally, in another embodiment, when the first virtual machine is added to the virtual machine cluster, the sending module 710 further sends registration information to an index server, where the registration information includes information about the first virtual machine, and the index server is a registration center of the virtual machine cluster and is configured to provide a registration service for a virtual machine in the virtual machine cluster; and the receiving module 720 further receives information about another virtual machine in the N virtual machines that is sent by the index server, so as to generate the virtual machine list.

According to this embodiment of the present disclosure, the computer system 700 further includes a selection module 750, configured to select according to the information about the N virtual machines that is stored in the virtual machine list, at least two virtual machines from the N virtual machines as neighboring virtual machines by using a neighbor relationship algorithm.

According to this embodiment of the present disclosure, the information about the N virtual machines includes any one or a combination of the following: status information of each virtual machine in the N virtual machines, neighbor relationship information of each virtual machine in the N virtual machines, a quantity of times of starting each virtual machine in the N virtual machines, a heartbeat value of each virtual machine in the N virtual machines, configuration information of each virtual machine in the N virtual machines, or configuration information of the virtual machine cluster.

For operations and functions of all parts of the computer system 700, refer to the foregoing method in FIG. 3. To avoid repetition, details are not repeatedly described herein.

Figure 8:
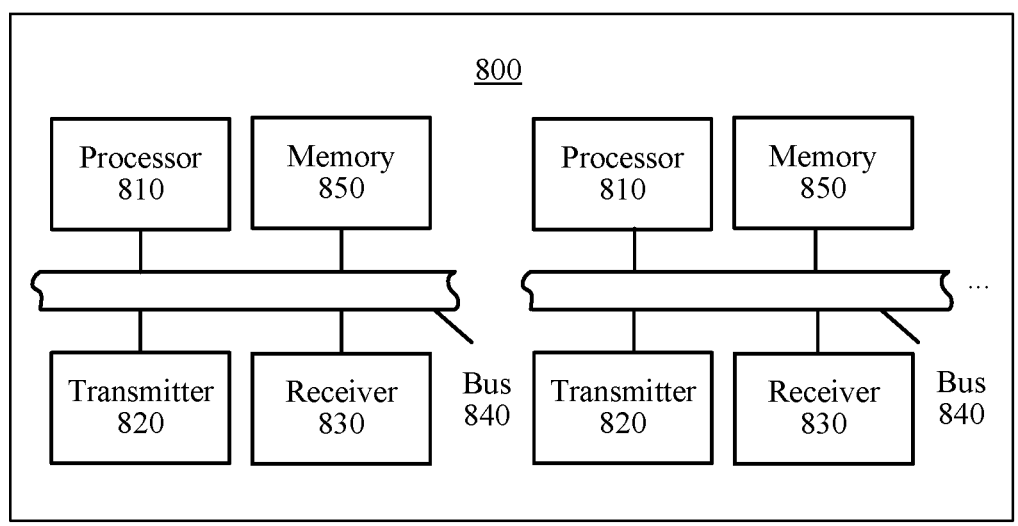
FIG. 8 is a schematic structural diagram of a computer system 800 according to an embodiment of the present disclosure.

FIG. 8 is a schematic structural diagram of a computer system 800 according to an embodiment of the present disclosure. The computer system 800 includes a physical hardware layer of at least one computer node. A virtual machine cluster runs at the physical hardware layer of the at least one computer node, and the virtual machine cluster includes N virtual machines. Each virtual machine in the N virtual machines stores a virtual machine list and works as a first virtual machine in a peer-to-peer manner. The virtual machine list includes information about the N virtual machines, and the first virtual machine includes: a processor 810, configured to invoke and execute, by using a bus 840, code stored in a memory 850; a transmitter 820, configured to send a first heartbeat message to at least two neighboring virtual machines in the N virtual machines, so that the at least two neighboring virtual machines detect the first heartbeat message, where a result of detecting the first heartbeat message is used to determine a status of the first virtual machine, and the first virtual machine establishes a neighbor relationship with the at least two neighboring virtual machines according to the information about the N virtual machines; and a receiver 830, configured to detect a second heartbeat message sent by a second virtual machine in the at least two virtual machines, where the first virtual machine is a neighboring virtual machine of the second virtual machine, a result of detecting the second heartbeat message and a detection result of detecting, by another neighboring virtual machine of the second virtual machine, a heartbeat message sent by the second virtual machine are used to determine a status of the second virtual machine, and the second virtual machine is one of the N virtual machines.

According to this embodiment of the present disclosure, each virtual machine in a virtual machine cluster may determine at least two neighboring virtual machines according to a virtual machine list stored in the virtual machine, and each virtual machine in the virtual machine cluster may send a heartbeat message to the at least two neighboring virtual machines of the virtual machine, so as to determine a status of the virtual machine according to detection results of the at least two neighboring virtual machines. Because a status of each virtual machine may be determined according to a result of detecting, by a neighboring virtual machine of the virtual machine, a heartbeat message sent by the virtual machine, a problem, existing in a master/slave architecture, that a master becomes a bottleneck of an entire cluster is avoided. In addition, because a master host is not re-elected, in a virtual machine cluster for which this solution is used to determine a status, a fault recovery time is not prolonged and no contention for resources occurs, and a fault tolerance capability and performance of the virtual machine cluster are improved.

Optionally, in another embodiment, the transmitter 820 further sends first synchronization information to the at least two neighboring virtual machines, where the first synchronization information is used to indicate an update of the virtual machine list stored in the first virtual machine, so that the at least two neighboring virtual machines update their respective virtual machine lists stored therein; the receiver 830 further receives second synchronization information sent by the second virtual machine, where the second synchronization information is used to indicate an update of a virtual machine list stored in the second virtual machine; and the processor 810 further updates, according to the second synchronization information, the virtual machine list stored in the first virtual machine.

Optionally, in another embodiment, the at least two neighboring virtual machines include two to six virtual machines that are in the N virtual machines and that have a capability of exchanging information directly with the first virtual machine.

Optionally, in another embodiment, the processor 810 is further configured to: when it is determined that the status of the second virtual machine is faulty, the second virtual machine triggers the second virtual machine to be restarted, or triggers the second virtual machine to be migrated from a source host of the second virtual machine to a target host, where the source host is a faulty host, and the target host is a normal host.

Optionally, in another embodiment, the processor 810 is further configured to: when it is determined that the status of the second virtual machine is faulty and the second virtual machine cannot be restarted, the first virtual machine triggers the second virtual machine to be migrated from a source host on which the second virtual machine is located to a target host, where the source host is a faulty host, and the target host is a normal host.

Optionally, in another embodiment, when it is determined that the status of the second virtual machine is a left state, the processor 810 further triggers the second virtual machine to be deleted from the source host on which the second virtual machine is located.

Optionally, in another embodiment, the transmitter 820 further sends the result of detecting the second heartbeat message to an upper-layer node of the N virtual machines, so that the upper-layer node determines the status of the second virtual machine according to the result of detecting the second heartbeat message and the result of detecting the heartbeat message sent by the second virtual machine to the another neighboring virtual machine of the second virtual machine; and the receiver 830 further receives an indication message sent by the upper-layer node, where the indication message is used to indicate the status of the second virtual machine.

Optionally, in another embodiment, the receiver 830 further receives the detection result of detecting, by the another neighboring virtual machine of the second virtual machine, the heartbeat message sent by the second virtual machine; and the receiving module 830 further determines the status of the second virtual machine according to the result of detecting the second heartbeat message and the detection result of detecting, by the another neighboring virtual machine of the second virtual machine, the heartbeat message sent by the second virtual machine.

Optionally, in another embodiment, when the first virtual machine is added to the virtual machine cluster, the transmitter 820 further sends information about the first virtual machine to another virtual machine in the N virtual machines; and the receiver 830 further receives respective information sent by the another virtual machine in the N virtual machines, so as to generate the virtual machine list.

Optionally, in another embodiment, when the first virtual machine is added to the virtual machine cluster, the transmitter 820 further sends registration information to an index server, where the registration information includes information about the first virtual machine, and the index server is a registration center of the virtual machine cluster and is configured to provide a registration service for a virtual machine in the virtual machine cluster; and the receiver 830 further receives information about another virtual machine in the N virtual machines that is sent by the index server, so as to generate the virtual machine list.

According to this embodiment of the present disclosure, the processor 810 selects, according to the information about the N virtual machines that is stored in the virtual machine list, at least two virtual machines from the N virtual machines as neighboring virtual machines by using a neighbor relationship algorithm.

According to this embodiment of the present disclosure, the information about the N virtual machines includes any one or a combination of the following: status information of each virtual machine in the N virtual machines, neighbor relationship information of each virtual machine in the N virtual machines, a quantity of times of starting each virtual machine in the N virtual machines, a heartbeat value of each virtual machine in the N virtual machines, configuration information of each virtual machine in the N virtual machines, or configuration information of the virtual machine cluster.

For operations and functions of all parts of the computer system 800, refer to the foregoing method in FIG. 3. To avoid repetition, details are not repeatedly described herein.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present disclosure.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium and includes instructions for instructing a computer device (which may be a personal computer, a server, or a network device) or a processor to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A method for processing a virtual machine cluster, wherein the virtual machine cluster comprises N virtual machines, each virtual machine in the N virtual machines stores a virtual machine list that comprises information about the N virtual machines, and the method comprises:
    sending, by a first virtual machine, a first heartbeat message to at least two neighboring virtual machines in the N virtual machines, so that the at least two neighboring virtual machines detect the first heartbeat message, wherein detecting the first heartbeat message by the at least two neighboring virtual machines is used to determine a status of the first virtual machine, and the first virtual machine establishes a neighbor relationship with the at least two neighboring virtual machines according to the information about the N virtual machines; and
    detecting, by the first virtual machine as a neighboring virtual machine of a second virtual machine in the at least two virtual machines, a second heartbeat message sent by the second virtual machine, wherein detecting the second heartbeat message by the first virtual machine and detecting, by another neighboring virtual machine of the second virtual machine, the second heartbeat message sent by the second virtual machine are used to determine a status of the second virtual machine;
    wherein the at least two neighboring virtual machines of the first virtual machine are at least two virtual machines that are closest to a physical location of the first virtual machine and that do not belong to a same host, and
    wherein the at least two neighboring virtual machines of the second virtual machine are at least two virtual machines that are closest to a physical location of the second virtual machine and that do not belong to a same host.

2. The method according to claim 1, wherein the method further comprises:
    sending, by the first virtual machine, first synchronization information to the at least two neighboring virtual machines, wherein the first synchronization information is used to indicate an update of a virtual machine list stored in the first virtual machine, so that the at least two neighboring virtual machines update their respective virtual machine lists stored therein;
    receiving, by the first virtual machine, second synchronization information sent by the second virtual machine, wherein the second synchronization information is used to indicate an update of a virtual machine list stored in the second virtual machine; and
    updating, by the first virtual machine according to the second synchronization information, the virtual machine list stored in the first virtual machine.

3. The method according to claim 1, further comprising:
    when the first virtual machine determines that the status of the second virtual machine is faulty, triggering, by the second virtual machine, the second virtual machine to be restarted, or triggering the second virtual machine to be migrated from a source host of the second virtual machine to a target host, wherein the source host is a faulty host, and the target host is a normal host.

4. The method according to claim 1, further comprising:
    when the first virtual machine determines that the status of the second virtual machine is faulty and the second virtual machine cannot be restarted, triggering, by the first virtual machine, the second virtual machine to be migrated from a source host on which the second virtual machine is located to a target host, wherein the source host is a faulty host, and the target host is a normal host.

5. The method according to claim 1, wherein the method further comprises:
    sending, by the first virtual machine, a result of detecting the second heartbeat message sent by the second virtual machine to the first virtual machine to an upper-layer node of the N virtual machines, so that the upper-layer node determines the status of the second virtual machine according to the result of detecting the second heartbeat message sent by the second virtual machine to the first virtual machine and a result of detecting the second heartbeat message sent by the second virtual machine to the another neighboring virtual machine of the second virtual machine; and receiving, by the first virtual machine, an indication message sent by the upper-layer node, wherein the indication message is used to indicate the status of the second virtual machine.

6. The method according to claim 1, wherein the method further comprises:

receiving, by the first virtual machine, a result of detecting, by the another neighboring virtual machine of the second virtual machine, the second heartbeat message sent by the second virtual machine; and determining, by the first virtual machine, the status of the second virtual machine according to a result of detecting the second heartbeat message sent by the second virtual machine to the first virtual machine and the result of detecting, by the another neighboring virtual machine of the second virtual machine, the second heartbeat message sent by the second virtual machine.

7. The method according to claim 1, wherein when the first virtual machine is added to the virtual machine cluster, the method further comprises:

sending, by the first virtual machine, information about the first virtual machine to another virtual machine in the N virtual machines; and receiving, by the first virtual machine, information sent by the another virtual machine in the N virtual machines, so as to generate a virtual machine list stored in the first virtual machine.

8. The method according to claim 1, wherein when the first virtual machine is added to the virtual machine cluster, the method further comprises:

sending, by the first virtual machine, registration information to an index server, wherein the registration information comprises information about the first virtual machine, and the index server is a registration center of the virtual machine cluster and is configured to provide a registration service for virtual machines in the virtual machine cluster; and receiving, by the first virtual machine, information about another virtual machine in the N virtual machines that is sent by the index server, so as to generate a virtual machine list stored in the first virtual machine.

9. The method according to claim 1, wherein the information about the N virtual machines comprises any one or a combination of the following: status information of each virtual machine in the N virtual machines, neighbor relationship information of each virtual machine in the N virtual machines, a quantity of times of starting each virtual machine in the N virtual machines, a heartbeat value of each virtual machine in the N virtual machines, configuration information of each virtual machine in the N virtual machines, or configuration information of the virtual machine cluster.

10. A computer system, wherein the computer system comprises a physical hardware layer of at least one host, a virtual machine cluster runs at the physical hardware layer of the at least one host, the virtual machine cluster comprises N virtual machines, each virtual machine in the N virtual machines stores a virtual machine list, and the virtual machine list comprises information about the N virtual machines, wherein a first virtual machine of the N virtual machines comprises:

a memory storing instructions; and a processor configured to execute the instructions to cause the first virtual machine to:

send a first heartbeat message to at least two neighboring virtual machines in a virtual machine cluster comprising N virtual machines, wherein each virtual machine in the N virtual machines stores a virtual machine list that comprises information about the N virtual machines, so that the at least two neighboring virtual machines detect the first heartbeat message, wherein detecting the first heartbeat message by the at least two neighboring virtual machines is used to determine a status of the first virtual machine, and the first virtual machine establishes a neighbor relationship with the at least two neighboring virtual machines according to the information about the N virtual machines; and detect a second heartbeat message sent by a second virtual machine in the at least two virtual machines, wherein the first virtual machine is a neighboring virtual machine of the second virtual machine, and detecting the second heartbeat message by the first virtual machine and detecting, by another neighboring virtual machine of the second virtual machine, the second heartbeat message sent by the second virtual machine are used to determine a status of the second virtual machine;

wherein the at least two neighboring virtual machines of the first virtual machine are at least two virtual machines that are closest to a physical location of the first virtual machine and that do not belong to a same host, and wherein the at least two neighboring virtual machines of the second virtual machine are at least two virtual machines that are closest to a physical location of the second virtual machine and that do not belong to a same host.

11. The computer system according to claim 10, wherein executing the instructions further causes the first virtual machine to:

send first synchronization information to the at least two neighboring virtual machines, wherein the first synchronization information is used to indicate an update of a virtual machine list stored in the first virtual machine, so that the at least two neighboring virtual machines update their respective virtual machine lists stored therein;

receive second synchronization information sent by the second virtual machine, wherein the second synchronization information is used to indicate an update of a virtual machine list stored in the second virtual machine; and update, according to the second synchronization information, the virtual machine list stored in the first virtual machine.

12. The computer system according to claim 10, wherein executing the instructions further causes the first virtual machine to:

when it is determined that the status of the second virtual machine is faulty, trigger the second virtual machine to be restarted, or trigger the second virtual machine to be migrated from a source host of the second virtual machine to a target host, wherein the source host is a faulty host, and the target host is a normal host.

13. The computer system according to claim 10, wherein executing the instructions further causes the first virtual machine to:

when it is determined that the status of the second virtual machine is faulty and the second virtual machine cannot be restarted, trigger the second virtual machine to be migrated from a source host on which the second virtual machine is located to a target host, wherein the source host is a faulty host, and the target host is a normal host.

14. The computer system according to claim 10, wherein executing the instructions further causes the first virtual machine to:

send a result of detecting the second heartbeat message by the first virtual machine to an upper-layer node of the N virtual machines, so that the upper-layer node determines the status of the second virtual machine according to the result of detecting the second heartbeat message by the first virtual machine and a result of detecting the second heartbeat message sent by the second virtual machine to the another neighboring virtual machine of the second virtual machine; and receive an indication message sent by the upper-layer node, wherein the indication message is used to indicate the status of the second virtual machine.

15. The computer system according to claim 10, wherein executing the instructions further causes the first virtual machine to:

receive a result of detecting, by the another neighboring virtual machine of the second virtual machine, the second heartbeat message sent by the second virtual machine; and determine the status of the second virtual machine according to a result of detecting the second heartbeat message by the first virtual machine and the result of detecting, by the another neighboring virtual machine of the second virtual machine, the second heartbeat message sent by the second virtual machine.

16. The computer system according to claim 10, wherein executing the instructions further causes the first virtual machine to:

when the first virtual machine is added to the virtual machine cluster, send information about the first virtual machine to another virtual machine in the N virtual machines; and receive information sent by the another virtual machine in the N virtual machines, so as to generate a virtual machine list stored in the first virtual machine.

17. The computer system according to claim 10, wherein executing the instructions further causes the first virtual machine to:

when the first virtual machine is added to the virtual machine cluster, send registration information to an index server, wherein the registration information comprises information about the first virtual machine, and the index server is a registration center of the virtual machine cluster and is configured to provide a registration service for virtual machines in the virtual machine cluster; and receive information about another virtual machine in the N virtual machines that is sent by the index server, so as to generate a virtual machine list stored in the first virtual machine.

18. The computer system according to claim 10, wherein the information about the N virtual machines comprises any one or a combination of the following: status information of each virtual machine in the N virtual machines, neighbor relationship information of each virtual machine in the N virtual machines, a quantity of times of starting each virtual machine in the N virtual machines, a heartbeat value of each virtual machine in the N virtual machines, configuration information of each virtual machine in the N virtual machines, or configuration information of the virtual machine cluster.

* * * * *